United States Patent [19]

Callaghan et al.

[11] 4,430,293
[45] Feb. 7, 1984

[54] CONTAINMENT HYDROGEN REMOVAL SYSTEM FOR A NUCLEAR POWER PLANT

[75] Inventors: Vincent M. Callaghan, West Granby; Edward P. Flynn; Bohdan M. Pokora, both of Windsor, all of Conn.

[73] Assignee: Combustion Engineering, Inc., Windsor, Conn.

[21] Appl. No.: 300,770

[22] Filed: Sep. 10, 1981

[51] Int. Cl.³ .................... G21C 19/00; G21C 13/00
[52] U.S. Cl. .................................. 376/314; 376/300
[58] Field of Search ............... 376/300, 301, 314; 55/16

[56] References Cited

U.S. PATENT DOCUMENTS 3,658,996  4/1972  Frumerman et al. ............. 376/300
3,910,817  10/1975  Frumerman et al. ............. 376/300
3,975,170  8/1976  Keating, Jr. ..................... 376/314

Primary Examiner—Harvey E. Behrend
Attorney, Agent, or Firm—David L. Smith

[57] ABSTRACT

A hydrogen removal system (10) separates hydrogen from the containment atmosphere of a nuclear power plant using a hydrogen permeable membrane separator (30). Water vapor is removed by condenser (14) from a gas stream withdrawn from the containment atmosphere. The gas stream is then compressed by compressor (24) and cooled (28,34) to the operating temperature of the hydrogen permeable membrane separator (30). The separator (30) separates the gas stream into a first stream, rich in hydrogen permeate, and a second stream that is hydrogen depleted. The separated hydrogen is passed through a charcoal adsorber (48) to adsorb radioactive particles that have passed through the hydrogen permeable membrane (44). The hydrogen is then flared in gas burner (52) with atmospheric air and the combustion products vented to the plant vent. The hydrogen depleted stream is returned to containment through a regenerative heat exchanger (28) and expander (60). Energy is extracted from the expander (60) to drive the compressor (24) thereby reducing the energy input necessary to drive the compressor (24) and thus reducing the hydrogen removal system (10) power requirements.

13 Claims, 1 Drawing Figure

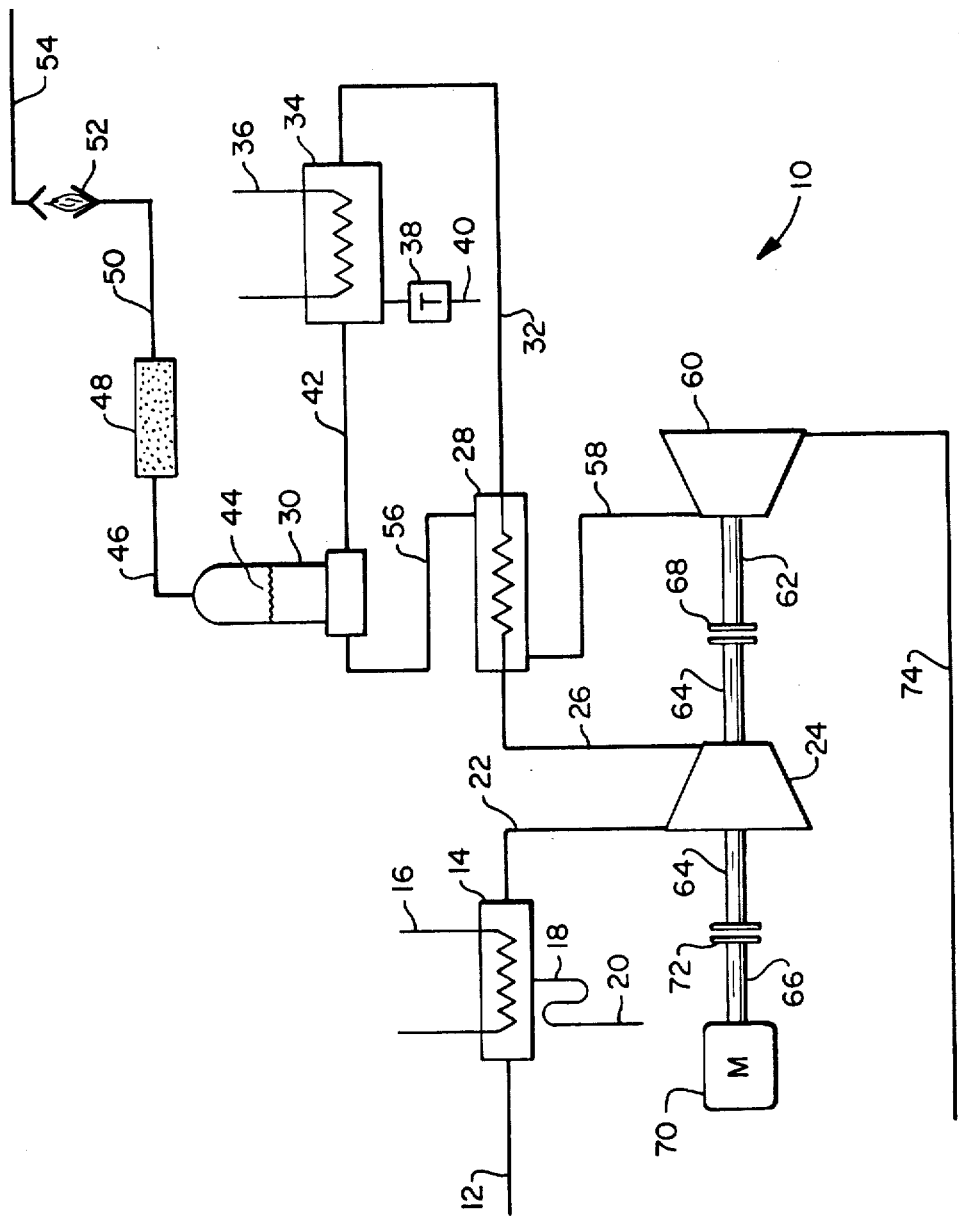

4,430,293

CONTAINMENT HYDROGEN REMOVAL SYSTEM FOR A NUCLEAR POWER PLANT

BACKGROUND OF THE INVENTION

This invention relates to a nuclear power plant containment system and in particular to a method and apparatus for the removal of hydrogen from the containment atmosphere using a gas permeable membrane separator.

During the operation of a water cooled nuclear reactor, hydrogen and oxygen are formed by the radiolytic decomposition of water. Systems designed to combine the hydrogen and oxygen gases are called recombiners. Gas recombiners can be categorized as the catalytic, convection, condenser, diffusion, thermal or forced flow types. These recombiners recombine hydrogen with oxygen from the containment atmosphere and return the recombined products to the containment atmosphere. These types of gas recombiners are generally small in capacity while large in physical size. The forced flow type is not limited in capacity but requires the use of gas pumping systems as well as a carrier gas.

The capacity of present hydrogen recombiners is sufficient to handle the hydrogen generated in normal operation of a nuclear reactor. However, large quantities of hydrogen may be generated by dissociation of water during an accident condition that will require releasing the hydrogen from the reactor vessel to the reactor containment building. Present hydrogen recombiners are designed to process about 39.2 cubic meters per minute (50 cubic feet per minute) of containment atmosphere. Present recombiners do not have the capacity to handle the quantity of hydrogen generated during an accident condition and would require an increase in capacity by a factor of approximately 100 to 400. In view of the power requirements and physical size of an increased capacity recombiner, an increased capacity recombiner or prior art design does not appear to be practical.

Therefore, a need exists for a method and apparatus for removing hydrogen gas from a combination of gases during the large scale hydrogen releases of a nuclear power plant accident condition. Such a method and apparatus would separate the hydrogen from the containment atmosphere for disposal independent of the containment atmosphere and use equipment of reasonable size while minimizing system power requirements.

SUMMARY OF THE INVENTION

The present invention overcomes the disadvantages of the prior art by removing hydrogen from the containment building atmosphere of a nuclear power plant utilizing equipment of reasonable size and minimum power requirements. The hydrogen is flared with atmospheric air and the combustion products released to the plant vent.

A stream of gas from the containment building is passed through a water cooled condenser to lower the temperature of the gas thereby reducing the required energy to compress the gas and to remove a major portion of the water vapor. The condensed water is returned to the containment building.

The cooled gas is compressed and passed through a regenerative heat exchanger to remove a portion of the heat of compression. The compressed gas is then passed through a cooler-drier to lower the temperature of the gas and remove additional water vapor. The condensed water is returned to the containment building.

The gas stream passes from the cooler-drier to the gas separator. The temperature of the gas entering the gas separator must be below 60° C. (140° F.), the maximum operating temperature of the hydrogen permeable membrane of the gas separator. In the gas separator, the gas stream is separated by a hydrogen permeable membrane into a first stream, rich in hydrogen permeate, and a second stream that is hydrogen depleted and nonpermeate.

The first stream is monitored to determine if the hydrogen permeable membrane has ruptured. Should the membrane rupture, corrective action is taken to prevent discharge of the containment atmosphere to the atmosphere.

The first stream, rich in hydrogen permeate, is passed through a charcoal adsorber which adsorbs trace quantities of hazardous radioactive materials that have passed through the membrane. The first stream, rich in hydrogen permeate, is then flared with atmospheric air in a gas burner. The resulting combustion products are discharged into the plant vent.

The second stream from the gas separator passes through a regenerative heat exchanger which removes most of the heat of compression from the gas stream leaving the compressor and transfers that heat energy to the second gas stream before the second stream enters an expander. By raising the temperature of the gas entering the expander, additional work can be extracted from the second stream by the expander. Since the expander and compressor have a common drive train driven by a single motor, the motor supplies only that portion of the compressor's power requirements that are not provided by the expander. The expanded, hydrogen depleted gas leaving the expander is returned to the containment building.

The containment hydrogen removal system separator size is minimized by removing the water vapor from the gas stream prior to the gas stream entering the separator, utilizing a compressor to increase the differential pressure across the hydrogen premeable membrane, and selecting a hydrogen permeable membrane of the appropriate surface area based on the flow rate of hydrogen desired and differential pressure across the membrane.

The containment hydrogen removal system power requirements are minimized by reducing the temperature of the gas entering the compressor and extracting as much of the input energy of compression as is practical in a regenerative heat exchanger and an expander.

BRIEF DESCRIPTION OF THE DRAWING

The FIGURE is a flow diagram of the containment hydrogen removal system.

DESCRIPTION OF THE PREFERRED EMBODIMENT

Containment hydrogen removal system 10 is a means of removing large scale hydrogen releases from the reactor containment building atmosphere following an accident resulting in extensive core cladding oxidation. A stream of gas is removed from the reactor containment building atmosphere and delivered to containment hydrogen removal system 10 by way of pipe 12. The gas stream contains a mixture of hydrogen gas and other gases, as well as a large quantity of water vapor. The gas stream is passed through condenser 14 where cooling water passing through cooling coil 16 causes a major portion of the water vapor to condense. The condensate passes through trap 18 and returns to the containment building by way of pipe 20.

By removing the water vapor the amount of gas handled by containment hydrogen removal system 10 downstream of vapor removal is reduced. Simultaneously, the hydrogen concentration of the gas stream is increased thereby providing for a more efficient hydrogen separation. Lowering the temperature of the gas from approximately 49° C. (120° F.) leaving the containment building to 43° C. (110° F.) at the exit of condenser 14 reduces the energy required to compress the gas.

The gas stream then passes through pipe 22 to compressor 24. Compressor 24 increases the pressure of the gas stream from approximately 101 kPa (14.7 psia) at the inlet of compressor 24 to 1480 kPa (214.7 psia) and, hence, the the partial pressure of the hydrogen in the gas stream. This higher pressure, in turn, causes a greater differential pressure across hydrogen permeable membrane 44 and reduces the required hydrogen permeable membrane 44 area to obtain a given hydrogen flow rate. Reducing the required hydrogen permeable membrane 44 area permits a larger quantity of gas to be processed by a compact containment hydrogen removal system 10. Heat of compression raises the temperature of the gas leaving compressor 24 to 485° C. (906° F.).

The gas stream then passes through pipe 26 to regenerative heat exchanger 28. Regenerative heat exchanger 28 is a gas-to-gas heat exchanger which removes most of the heat of compression from the gas stream. The temperature of the gas stream leaving regenerative heat exchanger 28 is reduced to 180° C. (355° F.). The heat removed from the gas stream is transferred to the second stream of gas leaving gas separator 30 raising the temperature of the second stream from 60° C. (140° F.) at the inlet to 443° C. (829° F.) at the outlet.

The gas stream then passes through pipe 32 to cooler-drier 34. Cooler-drier 34 is a water cooled heat exchanger in which cooling water passing through cooling coil 36 reduces the temperature of the gas stream from the exit temperature of regenerative heat exchanger 28 to or below the maximum hydrogen permeable membrane 44 operating temperature of 60° C. (140° F.). Some condensation of water vapor will occur in cooler-drier 34 as a result of the increase in partial pressure of water vapor due to compression of the gas stream. Trap 38 is provided to remove the condensate. The condensate is returned to the containment building by way of pipe 40.

The gas stream then passes through pipe 42 to gas separator 30. Hydrogen removal system 10 is controlled to maintain the gas temperature at the inlet to gas separator 30 at or below the maximum hydrogen permeable membrane 44 operating temperature of 60° C. (140° F.) by varying the flow through cooling coil 36. Gas separator 30 separates the gas stream into a first stream, rich in hydrogen permeate, and a second stream that is hydrogen depleted and nonpermeate. Most of the hydrogen in the gas stream entering gas separator 30 passes through hydrogen permeable membrane 44 forming in the first stream rich in hydrogen permeate. Factors that influence the rate at which hydrogen is transferred across gas permeable membrane 44 include the surface area of the membrane and the difference in partial pressure of hydrogen across the membrane. Having increased the partial pressure of hydrogen in the gas stream entering gas separator 30 in compressor 24, the surface area of hydrogen permeable membrane 44 may be made smaller and still achieve the same rate of hydrogen separation as a smaller difference in partial pressure across a membrane of larger surface area. Thus, the increased pressure of the gas stream due to compression functions to reduce the size of gas separator 30.

Containment hydrogen removal system 10 is designed to process 6,272 to 7,841 cubic meters per minute (8,000 to 10,000 cubic feet per minute) of containment atmosphere. The difference in partial pressure of hydrogen across hydrogen permeable membrane 44 and hence the differential pressure across hydrogen permeable membrane 44 is controlled to be 1380 kPa (200 psia) and should not be permitted to surge above 1724 kPa (250 psia), the maximum operating differential pressure of hydrogen permeable membrane 44.

The first stream is monitored to determine if hydrogen permeable membrane 44 has ruptured. Should hydrogen permeable membrane 44 rupture, corrective action is taken to prevent the discharge of containment atmosphere to the atmosphere. When hydrogen permeable membrane 44 is comprised of several modules, the defective module may be isolated and removed from service allowing the process to continue.

A small portion of radioactive material present in the gas stream will pass through hydrogen permeable membrane 44 into the first stream, rich in hydrogen gas permeate. The first stream passes through pipe 46 to charcoal adsorber 48. Charcoal adsorber 48 adsorbs the radioactive materials that passed through hydrogen permeable membrane 44.

The volume of the first stream, rich in hydrogen permeate, will vary in percentage but is generally less than 10% of the gas stream entering gas separator 30. The hydrogen in the first stream is too concentrated to burn without oxygen. The first stream passes through pipe 50 to permeate gas burner 52 where the hydrogen is flared in the presence of atmospheric air and the resulting combustion products are discharged through pipe 54 into the plant vent (not shown). Although energy could be recovered from the burning of hydrogen and transferred to the second stream prior to entering expander 60, controlling the hydrogen combustion process would be too difficult to be economical.

The second stream that is hydrogen depleted and nonpermeate passes through pipe 56 to regenerative heat exchanger 28 where a large portion of the above-mentioned heat of compression is transferred to the nonpermeate gas stream, thereby increasing the available work which can be extracted from the nonpermeate gas stream. The nonpermeate gas stream then passes through pipe 58 to expander 60. Expander 60 converts the enthalpy change of the nonpermeate gas during the expansion process to shaft work thereby recovering energy from the nonpermeate gas stream as pressure is reduced from the pressure entering expander 60 to containment pressure. The recovered shaft work provides a significant portion of the energy required to drive compressor 24 as drive shaft 62 of expander 60 and drive shaft 64 of compressor 24 are connected by coupling 68. Drive shaft 66 of motor 70 is connected to drive shaft 64 of compressor 24 by coupling 72. Through this common drive train, motor 70 supplies the portion of compressor 24 power requirements not provided by expander 60. Motor 70 could be a constant speed motor with coupling 68 being a variable speed coupling, such as a hydraulic coupling, or motor 70 could be a variable speed motor. In this manner, containment hydrogen removal system 10 power requirements are minimized.

Containment hydrogen removal system 10 will start at less than operating efficiency as motor 70 does not supply all of the power required by compressor 24. As the pressure downstream of the compressor builds up to operating pressure, expander 60 will recover shaft work to assist in the compression process until both compressor 24 and expander 60 are at operating pressure and motor 70 supplies the portion of compressor 24 power requirements not provided by expander 60. During this start-up time of approximately 30 minutes, gas separator 30 will operate at less than operating efficiency as the differential pressure across hydrogen permeable membrane 44 is less than operating differential pressure.

After leaving expander 60, the hydrogen depleted nonpermeate gas stream is returned to the containment building by way of pipe 74.

We claim:

1. In a nuclear power plant having a containment building for containing an atmosphere, a method of separating hydrogen gas from a mixture of hydrogen gas and other gases comprising the steps of:
   a. withdrawing a gas stream from the atmosphere of said containment building;
   b. cooling said gas to remove a major portion of the water vapor;
   c. returning the condensed water to said containment building;
   d. compressing said cooled gas;
   e. cooling said compressed gas to lower the temperature of said gas and remove additional water vapor;
   f. returning the condensed water to said containment building;
   g. separating said cooled gas into a first stream of gas rich in hydrogen and a second stream of gas that is hydrogen depleted;
   h. passing said first stream of gas rich in hydrogen to disposal; and
   i. returning said second stream to said containment building.

2. The method of separating hydrogen gas from a mixture of hydrogen gas and other gases as recited in claim 1 further comprising the steps of: expanding said second stream and extracting work from said expansion to achieve a portion of said compression whereby the work input necessary to achieve said compression is reduced.

3. The method of separating hydrogen gas from a mixture of hydrogen gas and other gases as recited in claim 2 further comprising the step of: passing said second stream in heat exchange relation with said compressed gas.

4. The method of separating hydrogen gas from a mixture of hydrogen gas and other gases as recited in claim 1 further comprising the step of: passing said second stream in heat exchange relation with said compressed gas.

5. The method of separating hydrogen gas from a mixture of hydrogen gas and other gases as recited in claim 4 further comprising the steps of: expanding said second stream and extracting work from said expansion to achieve a portion of said compression whereby the work input necessary to achieve said compression is reduced.

6. The method of separating hydrogen gas from a mixture of hydrogen gas and other gases as recited in claims 1, 2, 3, 4 or 5 further comprising the step of: adsorbing radioactive material from said first stream.

7. In a nuclear power plant having a containment building for containing an atmosphere, apparatus for separating hydrogen gas from a mixture of hydrogen gas and other gases comprising:
   a. a condenser for cooling gas to remove a major portion of the water vapor;
   b. a conduit for conveying gas from said containment building to said condenser;
   c. means for returning the condensed water from said condenser to said containment building;
   d. a compressor;
   e. a conduit for conveying said gas from said condenser to said compressor;
   f. means for driving said compressor;
   g. a cooler-drier for cooling said gas to lower the temperature of said gas and remove additional water vapor;
   h. a conduit for conveying said gas from said compressor to said cooler-drier;
   i. means for returning the condensed water from said cooler-drier to said containment building;
   j. a hydrogen permeable membrane separator for separating said gas into a first stream, rich in hydrogen permeate, and a second stream that is hydrogen depleted;
   k. a conduit for conveying said gas from said cooler-drier to said hydrogen permeable membrane separator;
   l. a conduit for conveying said first stream to disposal; and
   m. a conduit for returning said second stream to said containment building.

8. An apparatus for separating hydrogen gas from a mixture of hydrogen gas and other gases as recited in claim 7 further comprising: an expander operatively connected with said compressor and said drive means; said expander interposed in said second gas stream between said separator and said conduit for returning said second stream to said containment building.

9. An apparatus for separating hydrogen gas from a mixture of hydrogen gas and other gases as recited in claim 8 further comprising: means for transferring heat of compression from said compressed gas to said second stream.

10. An apparatus for separating hydrogen gas from a mixture of hydrogen gas and other gases as recited in claim 7 further comprising: means for transferring heat of compression from said compressed gas to said second stream.

11. An apparatus for separating hydrogen gas from a mixture of hydrogen gas and other gases as recited in claim 10 further comprising: an expander operatively connected with said compressor and said drive means; said expander interposed in said second gas stream between said separator and said conduit for returning said second stream to said containment building.

12. An apparatus for separating hydrogen gas from a mixture of hydrogen gas and other gases as recited in claims 7, 8, 9, 10 or 11 further comprising: a charcoal adsorber in said conduit for conveying said first stream to disposal for adsorbing radioactive particles.

13. An apparatus for separating hydrogen gas from a mixture of hydrogen gas and other gases as recited in claims 7, 8 or 11 wherein: said means for driving said compressor is an electric motor.

* * * * *